Patented May 23, 1944

2,349,772

UNITED STATES PATENT OFFICE 2,349,772

PARASITICIDAL PREPARATION

William P. ter Horst, Pompton Plains, N. J., assignor to United States Rubber Company, New York, N. Y., a corporation of New Jersey No Drawing. Application January 13, 1942, Serial No. 426,559

4 Claims. (Cl. 167—32)

This invention relates to new and useful improvements in parasiticidal preparations.

More particularly, the invention relates to parasiticides which may be used as seed protectants, fungicides, insecticides, insect repellents, and stimulants of plant growth.

The parasiticidal preparations contain as an essential active ingredient a halogen-substituted naphthoquinone, 2,3-dichlor-1, 4-naphthoquinone

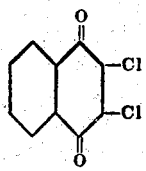

This chemical has been found to be many times more effective than known commercial parasiticides.

The tests tabulated below demonstrate the effectiveness of the chemicals as seed protectants:

Host, pea seed; concentration of chemical, .25% on the weight of seed. One hundred seeds were dusted with the halogen-substituted naphthoquinone and planted in greenhouse soil containing *Pythium, fusarium,* and *Rhizoctonia* spores. The soil was kept moist in order to render the test more severe. After 10 days, germination counts were made and the height of the plants was measured. This test was repeated 15 times. Each time, 100 untreated seeds were tested in a similar manner. For untreated seed, in one case, none germinated, and the maximum was 44%. For the 15 tests, the mean average difference in germination was 68% in favor of 2,3-dichlor-1, 4-naphthoquinone and the mean difference in height of plants was 2.1 cm. in favor of the treated. Variance analysis indicates that treatment is significant in favor of 2,3-dichlor-1, 4-naphthoquinone at odds greater than 1000 to 1.

2,3-dichlor-1, 4-naphthoquinone, in view of its outstanding fungicidal properties, was further tested on peas, varying the dosage from as low as $\frac{1}{32}$% on the weight of the seed up to 1%. The results were as follows:

| Dosage | Per cent germination after 10 days | | Average height in cm. after 10 days | |
|---|---|---|---|---|
| | Treated | Untreated | Treated | Untreated |
| ½%  | 85 | 32 | 5.71 | 3.68 |
| ¼%  | 90 | 7 | 5.65 | 2.29 |
| 1%  | 90 | 3 | 5.80 | 3.21 |

An example of the effectiveness of 2,3-dichlor-1, 4-naphthoquinone on cottonseed is as follows:

Machine delinted cotton seed, variety D & PL, was treated with 2,3-dichlor-1, 4-naphthoquinone at the rate of 3 ounces per bushel. Mississippi soil, which is known to be infested with a number of pathogenic organisms, particularly Rhizoctonia, was used. The test was made under greenhouse conditions. Results are as follows:

| Per cent germination after 10 days | | Average height in cm. after 10 days | |
|---|---|---|---|
| Treated | Untreated | Treated | Untreated |
| 96 | 32 | 5.5 | 3.7 |

All the above evidence strongly indicates that 2,3-dichlor-1, 4-naphthoquinone is a plant stimulant as well as a powerful fungicide.

2,3-dichlor-1, 4-naphthoquinones can be used to control the red spider, an important economic pest.

The chemical may be used not only as a seed protectant, but also to protect plants or soil from harmful pests including bacteria. Thus the seed-, plant-, or soil-protectants may be applied as dusts or sprays or, in solution, in suitable solvents. They may be applied undiluted, or diluted or mixed with carriers, other fungicides or insecticides, or insect repellents, fertilizers, hormones, buffering or safening agents, etc. The chemical may also be applied to prevent or retard fungicidal growth and the formation of mildew on, for example, cotton, rope, fur, hair, wool, leather, and the like.

Having thus described my invention, what I claim and desire to protect by Letters Patent is:

1. The method of immunizing seed against attack by fungi which comprises treating said seed with 2,3-dichlor-1,4-naphthoquinone.
2. The method of protecting seeds, plants and soil against attack by microorganisms which comprises treating said material with 2,3-dichlor-1,4-naphthoquinone.
3. The method of controlling mildew on organic material which comprises treating said organic material with 2,3-dichlor-1,4-naphthoquinone.
4. A fungicidal composition comprising a carrier and 2,3-dichlor-1,4-naphthoquinone as an essential active ingredient.

WILLIAM P. ter HORST.